(12) United States Patent
Stark

(10) Patent No.: US 10,314,223 B2
(45) Date of Patent: Jun. 11, 2019

(54) AGRICULTURAL IMPLEMENT HAVING FRAME SECTIONS MOVEABLE RELATIVE EACH OTHER

(71) Applicant: Vaderstad Holding AB, Vaderstad (SE)

(72) Inventor: Crister Stark, Vaderstad (SE)

(73) Assignee: Väderstad Holding AB, Väderstad (SE)

( * ) Notice: Subject to any disclaimer, the term of this patent is extended or adjusted under 35 U.S.C. 154(b) by 198 days.

(21) Appl. No.: 15/318,156

(22) PCT Filed: Jun. 12, 2015

(86) PCT No.: PCT/SE2015/050683
§ 371 (c)(1),
(2) Date: Dec. 12, 2016

(87) PCT Pub. No.: WO2015/190990
PCT Pub. Date: Dec. 17, 2015

(65) Prior Publication Data
US 2017/0118901 A1  May 4, 2017

(30) Foreign Application Priority Data

Jun. 13, 2014 (SE) ...................... 1450735

(51) Int. Cl.
*A01B 63/24* (2006.01)
*A01B 73/04* (2006.01)
(Continued)

(52) U.S. Cl.
CPC ............ *A01B 73/046* (2013.01); *A01B 63/24* (2013.01); *A01B 73/02* (2013.01); *A01B 73/04* (2013.01); *A01B 76/00* (2013.01); *A01B 63/002* (2013.01)

(58) Field of Classification Search
CPC ........ A01B 63/002; A01B 63/24; A01B 73/04
(Continued)

(56) References Cited

U.S. PATENT DOCUMENTS 3,165,036 A * 1/1965 Schmidt .................. E01C 7/356
  404/31
3,171,213 A   3/1965 Swarts et al.
(Continued)

FOREIGN PATENT DOCUMENTS

DE         10140383 A1    3/2003
DE     102007026280 A1   12/2008
(Continued)

OTHER PUBLICATIONS

International Search Report and Written Opinion for PCT/SE2015/050683 dated Oct. 12, 2015.

*Primary Examiner* — Gary S Hartmann
(74) *Attorney, Agent, or Firm* — Olive Law Group, PLLC

(57) ABSTRACT

An agricultural implement comprising a first frame section, a portion which is moveable relative to the first frame section, and an actuator for controlling a relative movement between the first frame section and the portion. The agricultural implement has a first sensor arranged to provide a first value corresponding to the angle of the first frame section relative to a predetermined reference plane or a predetermined reference direction, and a second sensor arranged to provide a second value corresponding to the angle of the portion relative to the predetermined reference plane or the predetermined reference direction. The reference plane or reference direction is defined in relation to a direction of gravity.

11 Claims, 2 Drawing Sheets

(51) Int. Cl.
*A01B 73/02* (2006.01)
*A01B 76/00* (2006.01)
*A01B 63/00* (2006.01)

(58) Field of Classification Search
USPC .............................................. 172/4
See application file for complete search history.

(56) References Cited

U.S. PATENT DOCUMENTS

| | | | |
|---|---|---|---|
| 4,413,685 A | | 11/1983 | Gremelspacher et al. |
| 4,912,662 A | | 3/1990 | Butler et al. |
| 5,079,095 A | * | 1/1992 | Reed .......................... E01C 7/18 404/19 |
| 5,153,026 A | * | 10/1992 | Reed .......................... E01C 7/18 106/277 |
| 5,261,459 A | | 11/1993 | Atkinson et al. |
| 6,220,366 B1 | | 4/2001 | Noonan |
| 6,402,051 B1 | | 6/2002 | Humpal |
| 6,651,500 B2 | | 11/2003 | Stewart |
| 8,505,645 B1 | | 8/2013 | Kelly et al. |
| 8,534,374 B2 | * | 9/2013 | Hake ...................... A01B 21/08 172/599 |
| 8,746,361 B2 | * | 6/2014 | Hake ...................... A01B 21/08 172/581 |
| 8,833,481 B2 | * | 9/2014 | Blunier ................ A01B 73/044 172/311 |
| 9,699,951 B2 | * | 7/2017 | Dienst .................... A01B 63/22 |
| 10,117,377 B2 | * | 11/2018 | Dienst .................... A01B 63/22 |
| 2002/0043374 A1 | | 4/2002 | Luca et al. |
| 2003/0127235 A1 | | 7/2003 | Dannigkeit |
| 2004/0016556 A1 | | 1/2004 | Barber |
| 2007/0023195 A1 | | 2/2007 | Peck et al. |
| 2007/0079976 A1 | | 4/2007 | Jagow |
| 2009/0088933 A1 | | 4/2009 | Kim |
| 2011/0211909 A1 | * | 9/2011 | Pristupa ................ E01C 19/20 404/81 |
| 2011/0290515 A1 | | 12/2011 | Yuen |
| 2013/0341056 A1 | | 12/2013 | Casper et al. |
| 2014/0000919 A1 | | 1/2014 | Bachman et al. |
| 2014/0060868 A1 | | 3/2014 | Blunier et al. |
| 2018/0049363 A1 | * | 2/2018 | Antoni ................... A01B 73/04 |

FOREIGN PATENT DOCUMENTS

| | | |
|---|---|---|
| EP | 1584223 B1 | 3/2009 |
| EP | 2080428 B1 | 7/2009 |
| FR | 2720892 A1 | 12/1995 |
| JP | 3082683 B2 | 8/2000 |
| JP | 5046609 B2 | 10/2012 |
| WO | 1988010408 A1 | 12/1988 |
| WO | 2013026661 A1 | 2/2013 |
| WO | 2014033365 A1 | 3/2014 |

* cited by examiner

AGRICULTURAL IMPLEMENT HAVING FRAME SECTIONS MOVEABLE RELATIVE EACH OTHER

CROSS REFERENCE TO RELATED APPLICATIONS

This application is a 35 USC 371 application of International PCT Patent Application No. PCT/SE2015/050683, filed on Jun. 12, 2015, which claims priority to Sweden Patent Application No. 1450735-4, filed on Jun. 13, 2014; the contents of which are hereby incorporated by reference herein in their entireties.

TECHNICAL FIELD

The present document relates to an agricultural implement having at least two frame sections moveable relative to each other and means for determining relative positions of the frame sections, and a method for setting frame sections of an agricultural implement.

BACKGROUND

It is known to utilize agricultural implements comprising a plurality of frame sections, which are moveable relative to each other. Examples of such agricultural implements are cultivators and seed drills, which have two or more side sections that are retractable or extendable between a transport position and a working position.

In the working position, such agricultural implements often allow some relative movement between the frame sections, for example in order to compensate for unevenness of the ground being cultivated by the agricultural implement.

Retracting or extending the agricultural implement is often carried out using hydraulic cylinders. In connection with retracting or extending, it is desirable to keep a check on the position in which the frame sections are situated, for example in order to ensure that the retracting or extending is completed, that the retracting or extending does not exceed a limit value and/or that the agricultural implement does not risk overturning.

Measuring the relative positions of the frame sections using sensors that detect the position of one or more hydraulic cylinders is known from U.S. Pat. No. 6,220,366B1. Measuring the relative positions of the frame sections using measuring devices arranged near a joint between the frame sections is also known from U.S. Pat. No. 6,220,366B1.

Arranging sensors that detect the positions of the hydraulic cylinders is in itself a well-known and functioning technique but relatively expensive. Detecting the angular position of a joint is also in itself a well-known and functioning technique, but likewise expensive and besides more complex, since it generally requires modifications on both sides of the joint in order to determine the position of the latter. In addition, the environment in which the sensors are required to operate is fairly difficult, including vibrations, dust, dirt and moveable objects which may damage the sensors. Therefore, there is a need for a simpler and less expensive solution for monitoring the retraction/extension operation.

SUMMARY

An object is therefore to provide an agricultural implement which has a more robust, simpler and less expensive solution for monitoring the retraction/extension operation.

The invention is defined by the attached independent patent claims. Embodiments emerge from the attached dependent patent claims, the description below and the drawings.

According to a first aspect, a soil-cultivating implement comprising a first frame section, a portion, which is moveable relative to the first frame section, an actuator for controlling a relative movement between the first frame section and the portion and a control unit, is provided. The agricultural implement further has a first sensor, arranged to provide a first value corresponding to the angle of the first frame section relative to a predetermined reference plane or a predetermined reference direction, and a second sensor, arranged to provide a second value corresponding to the angle of the portion relative to the predetermined reference plane or the predetermined reference direction. Said reference plane or reference direction is defined in relation to a direction of gravity. The control unit is arranged to receive said first and second values and to control the actuator based on the values.

The reference plane or the reference direction is preferably independent of the agricultural implement. For example, the reference plane or the reference direction can be a plane or a direction which is perpendicular to a direction of gravity.

Alternatively, the reference plane or the reference direction can be defined in a predetermined, e.g. fixed, relation to the direction of gravity.

In a special case, the reference direction can be the direction of gravity.

Alternatively, a reference plane can be selected as a vertical plane, e.g. a vertical plane which is parallel to the direction of travel of the agricultural implement or a vertical plane which is perpendicular to the direction of travel of the agricultural implement.

By utilizing an angle sensor of the type described above, increased scope for positioning the sensors is provided, i.e. each of the sensors can be positioned relatively freely on a respective frame section, which makes it possible to choose the positioning based on criteria such as optimal cable routing and protection against dust, impact and shock. In addition, it is not necessary to provide interacting structures on a pair of adjacent frame sections, which makes integration of sensors substantially less expensive.

An angle sensor of the type described above can be mounted in an arbitrary position on a frame section, even at a distance from and independent of a joint, which provides a simple configuration and installation. In addition, angle sensors are relatively small and fairly inexpensive components.

By retrieving information about the absolute location of a respective frame section from angle sensors, it is possible to determine the relative angle of the frame sections, which can be utilized to control a retraction/extension operation.

As a bonus of retrieving data from the angle sensors, it is possible to continuously follow the position of each frame section provided with an angle sensor while work is in progress.

A sensor which measures the position of a portion in relation to a predetermined reference plane or reference direction can be positioned in a protected location and also be enclosed properly, so that it is less exposed to external influences.

The first and second sensors can be angle sensors, preferably arranged to provide the first and second values in the form of digital values.

At least one of the sensors can be configured to provide a one-dimensional value, which represents the angle of the sensor-associated frame section or portion relative to a vertical plane.

At least one of the sensors can be configured to provide a two-dimensional value, which represents the angle of the sensor-associated frame section or portion in at least two non-parallel vertical planes.

Specifically, the sensors can be formed by respective inclinometers.

Each of the sensors can be selected from a group consisting of a 1D inclinometer, a 2D inclinometer and a 3D inclinometer.

The portion can be a soil-cultivating tool or a soil-contacting sensor portion.

For example, the angular position of a soil-cultivating tool can be detected and utilized as an indication of load on or deflection of the tool. Alternatively, the angular position of a ground-contacting sensor can be detected and utilized as an indication of the condition of the ground which is to be cultivated and/or as an indication of the condition of the ground which has been cultivated by the agricultural implement.

Alternatively, the portion can be a second frame section.

The first frame section can be a main section and the relative movement between the first and second frame sections can substantially comprise a change of the angle of the second frame section relative to a predetermined reference plane or a predetermined reference direction.

The agricultural implement can comprise a third, intermediate frame section, wherein the third frame section can be rotatable relative to the first frame section about a first axis, and the second frame section can be rotatable relative to the third frame section about a second axis. The first sensor can be arranged on the first frame section and the second sensor can be arranged on the second frame section.

The first and second axes can be substantially horizontal. By "substantially horizontal" is meant horizontal with a deviation of a maximum of 30°, preferably a maximum of 20°, preferably a maximum of 10°, a maximum of 5° or a maximum of 2°.

By positioning the sensors on the first and second frame sections, there is no need at all to position a sensor on the third frame section. It is still possible to achieve sufficient control of the angular positions of the frame sections.

The second frame section can be a side section, which is rotatable relative to the main section about at least a substantially horizontal lateral axis, which is situated in a plane that contains the direction of travel +/−30°, preferably +/−20°, +/−10° or +/−5°.

In practice, the axis can be substantially parallel to the direction of travel.

One of the frame sections can be a main section and the second frame section can be an implement section, which is rotatable relative to the main section about at least a substantially horizontal transverse axis, which is situated in a plane that is perpendicular to the direction of travel +/−30°, preferably +/−20°, +/−10° or +/−5°.

According to a second aspect, a method for setting frame sections of a soil-cultivating implement comprising a first frame section, a portion, which is moveable relative to the first frame section, and an actuator for providing a relative movement between the first frame section and the portion, is provided. The method comprises receiving a first value corresponding to one of the angles of the frame section and the portion relative to a predetermined reference plane or a predetermined reference direction, receiving a second value corresponding to the second of the angles of the frame section and the portion relative to the predetermined reference plane or the predetermined reference direction, and controlling the actuator or another function based on said first and second values, presenting said first and/or second value(s), or one or more derived values thereof, for a user, and/or providing an alarm signal.

Examples of such other functions can be retracting/extending support wheels, other tools or marker arms, activating/deactivating applicators of seed, fertilizer, herbicide, raising/lowering or retracting/extending other frame sections.

The method can further comprise calculating a relative angle between the first frame section and the portion and controlling the actuator based on the relative angle.

According to a third aspect, a method for retracting or extending an agricultural implement is provided, comprising first completing a retraction/extension operation about one of the first and second axes, while rotating about the second axis is prevented, then completing a retraction/extension operation about the second of the axes, while rotating about one of the axes is prevented, retrieving a plurality of measured values during said retraction/extension operation from at least the second sensor, and driving the actuator associated with respective axis at least partly based on said measured values.

By this method, it is possible, with a smaller number of sensors, to carry out a retraction/extension operation while providing continuous feedback with respect to the retraction/extension operation.

DETAILED DESCRIPTION

Figure 1:
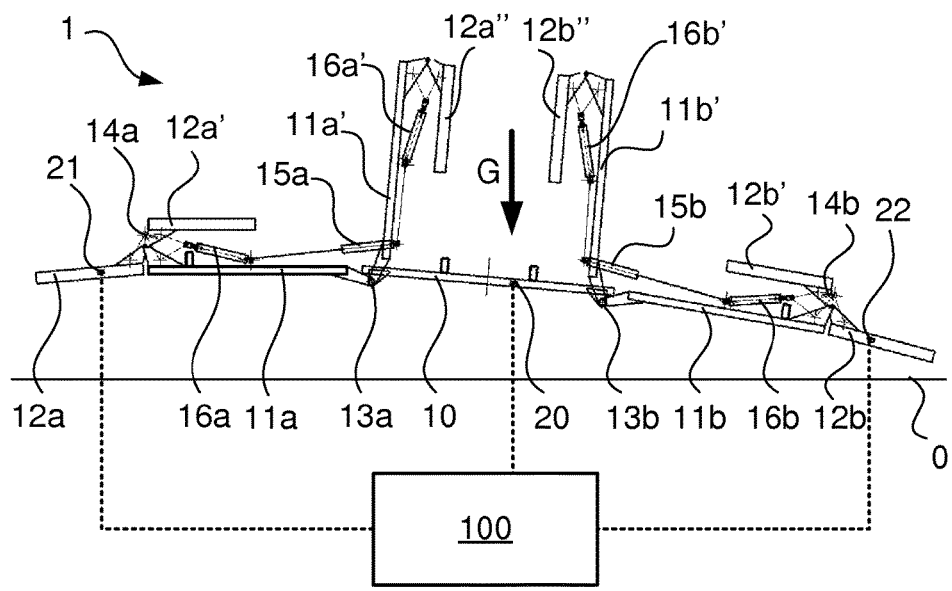
FIG. 1 shows a view of a frame of an agricultural implement, viewed in a plane across a direction of travel and with side frame sections in three different positions: extended (11*a*, 11*b*, 12*a*, 12*b*), retracted halfway (11*a*, 11*b*, 12*a'*, 12*b'*) and fully retracted (11*a'*, 11*b'*, 12*a"*, 12*b"*).

With reference to FIG. 1, a soil-cultivating agricultural implement 1 will be described, which comprises a frame which has, viewed in a plane across a direction of travel, five frame sections 10, 11*a*, 11*b*, 12*a*, 12*b*. The frame sections 10, 11*a*, 11*b*, 12*a*, 12*b* are rotatable relative to each other about horizontal axes 13*a*, 13*b*, 14*a*, 14*b* which are substantially parallel to the direction of travel.

By "horizontal axis" is meant an axis which is horizontal when the agricultural implement is on a horizontal surface.

A "frame section" can, in the widest sense of the concept, be formed by a beam of an arbitrary cross section, usually square or circular, which carries one or more tools (preferably at least two tools). For example, a beam can carry one or more, such as 5-200, preferably 5-100, 5-50 or 5-25, separate tools. The tools can be harrow tines, cultivator tines, leveling tools, disk tools, furrow openers, fertilizer colters, compactor wheels, roller rings, roller drums or similar and combinations of two or more of these.

As an alternative, a frame section can be formed by an assembly of joined beams, which are arranged such that, when the agricultural implement is arranged on level ground and in an operational status, they extend at least in two horizontal directions, which can be, but do not have to be, perpendicular to each other. The frame section can extend substantially in one plane, but can also be concave or convex upward or downward. The frame section can also have projecting parts upward or downward, e.g. forming attachment points for actuators, springs, tools, wheels (support wheels or transport wheels), containers (e.g. for seed, fertilizer, herbicide) or other equipment to be carried by the frame.

As a further alternative, the frame section can have as a function to carry one or more additional frame sections. Such a frame section can, but does not have to, carry tools.

Regardless of which, a frame section is formed by a substantially rigid unit, i.e. a unit which is not deformed apart from the deformation of the material under load.

FIG. 1 shows the agricultural implement 1 with the tools removed. The agricultural implement 1 can be a cultivator or a harrow. It will, however, be appreciated that a corresponding arrangement with a middle section and one or more side sections on each side of this can be utilized for a seed drill, fertilizer spreader, planter or similar. In the illustration in FIG. 1, the agricultural implement is inclining slightly to the right compared to the ground level 0.

The agricultural implement 1 in FIG. 1 comprises a frame whose frame sections are formed by a middle section 10, first and second intermediate side sections 11a, 11b; 11a', 11b' and outer side sections 12a, 12b; 12a', 12b'; 12a", 12b". The intermediate side sections 11a, 11b are rotatable relative to the middle section 10 about respective first horizontal axes 13a, 13b, which can be provided in a manner known per se.

In FIG. 1, the intermediate side sections are shown with reference numbers 11a, 11b in an extended position and with reference numbers 11a', 11b' in a retracted position.

The outer side sections 12a, 12b are rotatable relative to the middle section and the intermediate side sections 11a, 11b about respective second horizontal axes 14a, 14b, which connect the outer side sections to the intermediate side sections, and which can be provided in a manner known per se.

In FIG. 1, the outer side sections are shown with reference numbers 12a, 12b in an extended position, with reference numbers 12a', 12b' in a partly retracted position (approximately 180° retracted relative to respective intermediate side section 11a, 11b) and with reference numbers 12a", 12b" in a fully retracted position.

Movement of the side sections can be provided by actuators 15a, 15b, 16a, 16b, e.g. in the form of hydraulic cylinders known per se.

At least two frame sections moveable relative to each other are provided with sensors 20, 21, 22, which are connected to a control unit 100.

Each sensor is configured to provide a measured value that represents the orientation of the frame section associated with the sensor in relation to a predetermined reference plane or a predetermined reference direction.

Such sensors are known from e.g. U.S. Pat. No. 4,912, 662A. As a complement to an inclination sensor, an accelerometer or gyro sensor can be used to stabilize the signal from the inclination sensor. Such gyro sensors are known from e.g. U.S. Pat. No. 6,651,500A.

A reference plane can be a horizontal plane (i.e. a plane which is perpendicular to the direction of gravity). Alternatively, a reference plane can be selected based on a horizontal plane, such as a vertical plane. A vertical reference plane can advantageously be parallel to, or perpendicular to, the direction of travel.

A reference direction can be a horizontal direction (i.e. a direction which is perpendicular to the direction of gravity) which is parallel to, or perpendicular to, the direction of travel.

It will be appreciated that a reference plane and reference directions can be selected arbitrarily, but it is practical, not least for the user, to indicate angles in relation to a horizontal plane (i.e. a plane which is perpendicular to a direction of gravity) and based on the direction of travel of the agricultural implement and its transverse direction, i.e. a direction which is perpendicular to the direction of travel.

As an alternative, at least for presenting to the user, a plane for a middle section 10 can be selected as a reference plane, wherein the orientation of other frame sections can be presented based on the orientation of the middle section 10.

The measured value can comprise one or more components, depending on how many dimensions the sensor is configured to detect. In this respect, a sensor which is configured to provide measured values for more than one dimension is considered equivalent to a group of sensors (which can be spaced from each other) that provide the same function.

In a simple embodiment, the sensors 20, 21, 22 can be configured to provide a respective measured value representing an angle relative to a horizontal reference direction perpendicular to the direction of travel.

In a more complete embodiment, each sensor 20, 21, 22 can be configured to provide a respective measured value in the form of a two-dimensional vector, which represents (or based upon which can be derived) angles relative to the first and second horizontal reference directions, perpendicular to or parallel to the direction of travel.

Sensors 20, 21, 22 can be arranged on all frame sections, or on a part-quantity of the frame sections.

In the example shown in FIG. 1, the sensors 20, 21, 22 are only arranged on the middle section 10 and on the outer side sections 12a, 12b. In the shown design, the sensors 21, 22 on the outer side sections 12a, 12b can be utilized to detect, during a retraction/extension operation, the orientation of the outer side sections 12a, 12b; 12a', 12b'; 12a", 12b" as well as the orientation of the inner side sections 11a, 11b; 11a', 11b', this by completing the retraction/extension of the outer side sections 12a, 12b relative to the inner side sections 11a, 11b (to position 12a', 12b') before the retraction/extension of the inner side sections 11a, 11b relative to the middle section 10 (to position 11a', 11b") commences.

The control unit 100 can be arranged to receive measured values from each sensor via cables or wirelessly. The received measured values can be utilized to calculate relative angles between frame sections and/or to control actuators in a working position as well as a transport position, and during retraction/extension operations from a working position to a transport position and vice versa.

Measured values, or values derived from these, can be presented to the user numerically and/or graphically, can be utilized as the basis of controlling actuators and can be stored for providing a log of the operation.

It is also possible to carry out retraction or extension operations with regard to the orientation of the agricultural implement in relation to a direction of gravity. For example, a retraction/extension operation can be carried out in such a way as to ensure that the centre of gravity for the agricultural implement is always inside its support surface, preferably with a sufficient margin in order to compensate for measuring errors and effects such as wind.

Figure 2A:
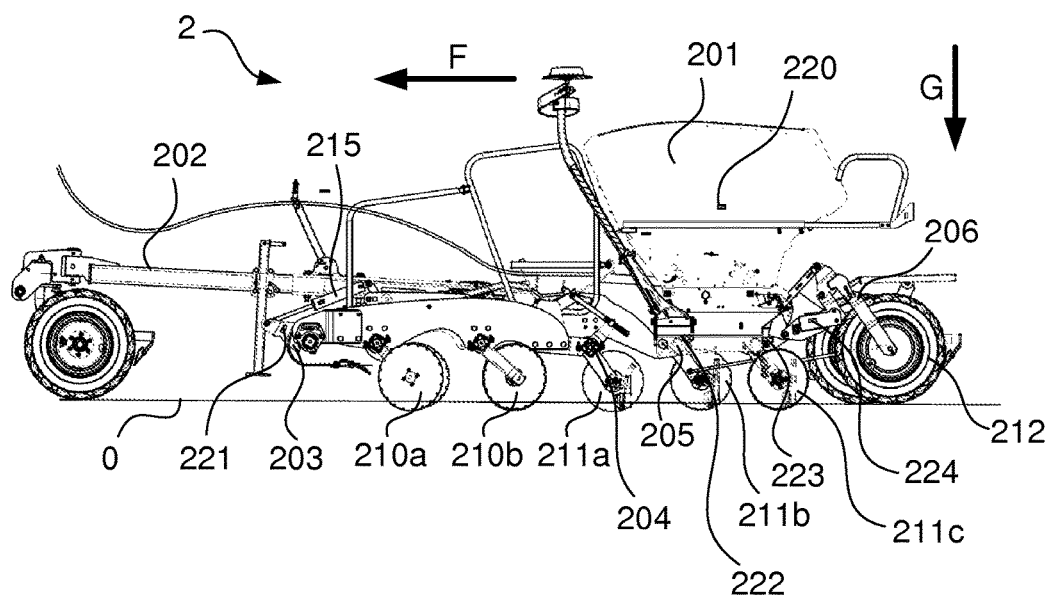
FIG. 2*a* shows a side view of a seed drill, which is provided with a plurality of angle sensors 220, 221, 222, 223, 224.
Figure 2B:
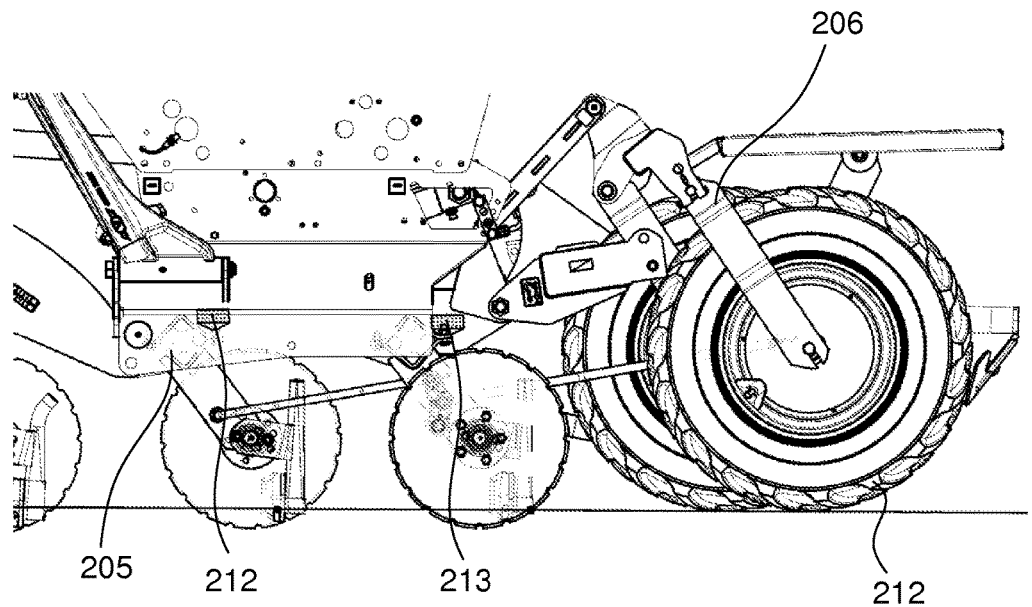
FIG. 2*b* shows a detail of the seed drill in FIG. 2*a*.

With reference to FIG. 2a-2b, an agricultural implement will be described, which comprises a frame which has, viewed in the direction of travel, a plurality of frame sections 202, 203, 204, 205, 206. The agricultural implement shown in FIG. 2a-2b is formed by a seed drill, which has a seed container 201 and a main frame 202.

The subframe sections 203, 204, 205, 206 are here rotatable relative to a main frame section 202 about horizontal axes which are substantially perpendicular to the direction of travel F.

On the seed container 201, which is fixed in relation to the main frame 202, a first sensor 220 is arranged. The sensor can be of any of the types described above and is also configured to provide a measured value that represents the position of the main frame relative to a predetermined reference plane or a predetermined reference line.

In the example shown, the sensor 220 can be configured to provide a measured value representing the angular position of the main frame 202 in a vertical plane which is parallel to the direction of travel F.

Alternatively, or as a complement, the sensor 220 can also be configured to provide a second measured value representing the angular position of the main frame 202 in a vertical plane which is perpendicular to the direction of travel.

A first subframe section 203 comprises at least a transverse beam, on which a plurality of harrow disks 210a, 210b are arranged. The subframe section 203 is rotatable relative to the main frame section 202 about a transverse horizontal axis and the rotation is provided using an actuator, which can be a hydraulic cylinder (not shown).

On the first subframe section 203, a second sensor 221 is arranged, which is configured to measure the angular position of the subframe section 203 in relation to one or more predetermined reference plane(s) or predetermined reference directions according to what has been stated above with respect to the main frame section 202.

A second subframe section 204 comprises at least one transverse beam, on which a plurality of furrow openers 211a, 211b, 211c (here provided with seed disks) are arranged. In the same way as the first subframe section 203, the second subframe section is rotatable relative to the main frame 202, using an actuator (not shown).

In the same way as the main frame section 202, a third sensor 222 is arranged on the second subframe section 204 and configured to measure the angular position of the subframe section 204 in relation to one or more predetermined reference plane(s) or predetermined reference directions according to what has been stated above with respect to the main frame section 202.

It will be appreciated that additional subframe sections 205, 206 can be provided according to what is considered desirable, which each can be provided with sensors 223, 224 according to what was discussed above. In the example in FIG. 2a-2b, a rear subframe section 206 is present for example, which is set up to carry a compactor wheel assembly 212.

By providing angle sensors for various subframe sections, it is possible to determine the angular position of respective subframe section 203, 204, 205, 206 relative to the main frame 202, and based upon that, to determine factors such as height and/or working depth.

This information can be utilized to control and follow up action sequences, such as retracting/extending subframe sections, conversion between e.g. working position and turning position. It is also possible to utilize information from the sensors 220, 221, 222, 223, 224 for triggering actions or action sequences, such as extending/retracting a marker, starting/shutting off seed application, and/or extending/retracting subsystems, such as e.g. front tools 210a, 210b and/or furrow openers 211a, 211b, 211c.

It will be appreciated that agricultural implements with frame sections that are rotatable relative to each other about both horizontal axes that are parallel to the direction of travel and that are perpendicular to the direction of travel can be provided.

For example, a side section of the implement shown in FIG. 1 can comprise two or more frame sections which are rotatable relative to each other about a horizontal axis which is substantially perpendicular to the direction of travel.

In the same way, the seed drill in FIG. 2a-2b can comprise side sections according to what has been described with reference to FIG. 1.

Figure 3:
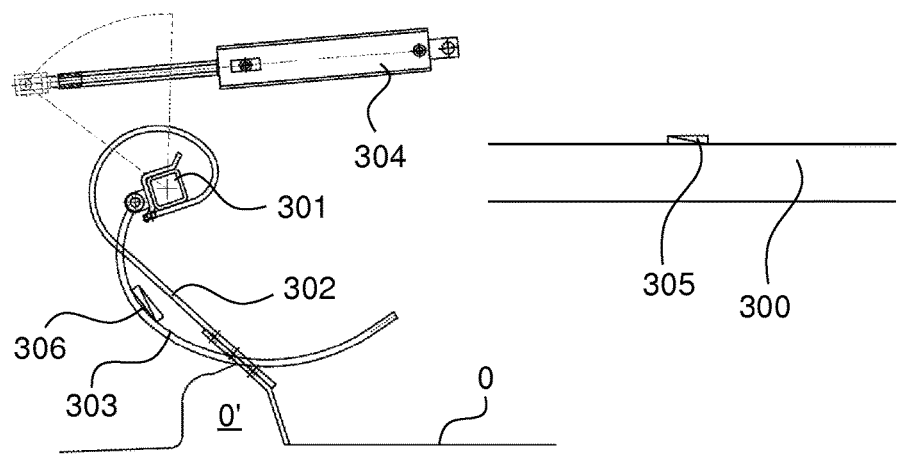
FIG. 3 is a schematic view of a tool rotatable relative to a frame section.

FIG. 3 shows a leveling tool 302, which can be used on e.g. a seed drill or a cultivator with the purpose of breaking up lumps of soil. Such leveling tools are often arranged at the very front of the agricultural implement, so that the soil 0 is leveled before cultivating using e.g. harrow tines, cultivator tines, harrow disks and/or seed disks.

The agricultural implement here has a main frame 300 and a tool beam 301 rotatable relative to this. The tool beam 301 can be substantially transverse, and its angular position relative to the main frame can be adjustable using an actuator 304. The leveling tool 302 is attached to the tool beam 301.

A first sensor 305 is arranged on the main frame 300 and can provide a value corresponding to the angle of the main frame relative to a reference plane or a reference direction.

When using such leveling tools 302, a ridge of soil 0' is often created. It is desirable that this ridge of soil 0' does not get too large, since it can then affect the work of the agricultural implement in a negative way. In addition, such a ridge of soil can contribute to increased energy consumption for the tractor which is towing the agricultural implement.

In order to measure the size of the ridge of soil 0', it is possible to provide a runner or ski 303, which is freely rotatably attached to the tool beam 301. The runner has a shape which makes its angular position relative to the tool beam 301 to be a function of the height of the ridge of soil 0'.

By providing the runner 303 with a second sensor 306 of the same type as described above, it is possible to provide an indication of the height of the ridge, wherein the angular position of the leveler 302 can be set using the actuator 304.

It will be appreciated that the concepts with inclination sensors described above can be combined with e.g. global or local positioning systems, such as GPS, which makes it possible to determine the geographical position of the agricultural implement, present this on a map and initiate streamlining of the actuators for retracting/extending, inclination adjustment, changing working depth or similar based on the current position of the agricultural implement.

It is, for example, possible to save angle data in a database and to associate each angle data point with positioning data from e.g. a GPS receiver or similar.

Based on such data, it is, for example, possible to create a height map. Such data can also be used when following up sowing and/or cultivation results, e.g. that by an occurrence at different positions, for instance angle data for the agricultural implement can be derived.

It is also possible in real time to feed back the angular position to the operator driving the agricultural implement. Such feedback can be realized based on angle data only. Alternatively, feedback can be realized for each given position, based on a comparison between current angle data and saved angle data and possibly also saved occurrence data.

The invention claimed is:

1. A soil-cultivating agricultural implement comprising:
a first frame section,
a portion which is moveable relative to the first frame section, and
an actuator for controlling a relative movement between the first frame section and the portion,
a control unit,
a first sensor, arranged to provide a first value corresponding to the angle of the first frame section relative to a predetermined reference plane or a predetermined reference direction, and
a second sensor arranged to provide a second value corresponding to the angle of the portion relative to the predetermined reference plane or the predetermined reference direction,
wherein said reference plane or reference direction is defined in relation to a direction of gravity (G), and
the control unit is arranged to receive said first and second values and to control the actuator based on the values.

2. The agricultural implement according to claim 1, wherein the first and second sensors are angle sensors, arranged to provide the first and second values in the form of digital values.

3. The agricultural implement according to claim 1, wherein at least one of the sensors is configured to provide a two-dimensional value, which represents the angle of the sensor-associated frame section or portion in at least two non-parallel vertical planes.

4. The agricultural implement according to claim 1, wherein the sensors are formed by respective inclinometers.

5. The agricultural implement according to claim 1, wherein the portion is a soil-cultivating tool or a soil-contacting sensor portion.

6. The agricultural implement according to claim 1, wherein the portion is a second frame section.

7. The agricultural implement according to claim 6, wherein the first frame section is a main section and the relative movement between the first and second frame sections substantially comprises a change of the angle of the second frame section relative to a predetermined reference plane or a predetermined reference direction.

8. The agricultural implement according to claim 6 or 7, wherein the agricultural implement comprises a third, intermediate frame section,
wherein the third frame section is rotatable relative to the first frame section about a first axis, and the second frame section is rotatable relative to the third frame section about a second axis,
wherein the first sensor is arranged on the first frame section and the second sensor is arranged on the second frame section.

9. The agricultural implement according to claim 6, wherein the second frame section is a side section, which is rotatable relative to the main section about at least a substantially horizontal lateral axis, which is situated in a plane that contains the direction of travel +/−30°.

10. The agricultural implement according to claim 6, wherein one of the frame sections is a main section and the second frame section is an implement section, which is rotatable relative to the main section about at least a substantially horizontal transverse axis, which is situated in a plane that is perpendicular to the direction of travel +/−30°, +/−20°, +/−10° or +/−5°.

11. The agricultural implement according to claim 6, wherein the second frame section is a side section, which is rotatable relative to the main section about at least a substantially horizontal lateral axis, which is situated in a plane that contains the direction of travel +/−10°.

* * * * *